United States Patent [19]

Binns et al.

[11] Patent Number: 4,612,616
[45] Date of Patent: Sep. 16, 1986

[54] FUEL CONTROL SYSTEM FOR A GAS TURBINE ENGINE

[75] Inventors: John M. Binns, Sutton Coldfield, England; Douglas A. Caine, Ramsey; Byron A. T. Spencer, Hillside, both of N.J.

[73] Assignee: Lucas Industries Public Limited Company, Birmingham, England

[21] Appl. No.: 632,535

[22] Filed: Jul. 19, 1984

[30] Foreign Application Priority Data

Jul. 28, 1983 [GB] United Kingdom ............... 8320319

[51] Int. Cl.⁴ .............................................. F02C 9/02
[52] U.S. Cl. ............................ 364/431.02; 60/39.281
[58] Field of Search ................ 364/431.02, 494, 174, 364/167, 130, 400; 60/39.281

[56] References Cited

U.S. PATENT DOCUMENTS

| 3,935,703 | 2/1976 | Smith | 60/39.281 |
| 3,956,889 | 5/1976 | Smith | 60/39.281 |
| 3,981,141 | 9/1976 | Smith | 60/39.281 |
| 4,187,673 | 2/1980 | Smith | 60/39.281 |
| 4,270,345 | 6/1981 | Kast | 60/39.281 |
| 4,275,558 | 6/1981 | Hatch et al. | 60/39.281 |
| 4,470,118 | 9/1984 | Morrison | 364/431.02 |

*Primary Examiner*—Parshotam S. Lall
*Attorney, Agent, or Firm*—Leydig, Voit & Mayer, Ltd.

[57] ABSTRACT

The main metering valve of a gas turbine fuel control system is positioned by a servo pressure signal controlled by a servo valve. The servo valve is positioned by the sum of forces derived from the operating positions of a torque motor and a stepping motor. If both motors are de-energized by electrical failure the servo valve, and hence the main metering valve is maintained in a position which corresponds to the steady-running fuel flow at the time of failure.

10 Claims, 10 Drawing Figures

FUEL CONTROL SYSTEM FOR A GAS TURBINE ENGINE

This invention relates to a fuel control system for a gas turbine engine, and in particular to such a system when intended for an engine having a gas generator unit and a separate power turbine.

It has been proposed to provide a fuel metering device which is actuated by a stepping motor controlled by a digital computer, the computer being responsive to operating conditions of the engine. In such a system it is provided that a computer malfunction will cause the arrest, or "freeze" of the stepping motor in the operating position at which the malfunction occurred. Such an arrangement has the disadvantage that if freeze occurs when flow through the metering device is such as to correspond to a requirement to accelerate or decelerate the engine, acceleration or deceleration will continue.

It is an object of the present invention to provide a fuel control system in which a metering device is acted upon by both a stepping motor and a torque motor, and in which the stepping motor is arranged to position the metering device so as to provide a fuel flow suitable for steady running only of the engine, the metering device being urged away from the steady running position by the torque motor, to provide acceleration or deceleration fuel flows.

According to the invention a fuel control system for a gas turbine engine comprises a fuel metering device, a stepping motor responsive to first electrical signals, means for providing a first force output corresponding to the operating position of said stepping motor, a torque motor responsive to second electrical signals for providing a second force output, a control device responsive to the sum of said force outputs for positioning said metering device, and a computing device responsive to operating conditions of said engine for generating said first and second electrical signals.

An embodiment of the invention will now be described by way of example only and with reference to the accompanying drawings in which.

Figure 1:
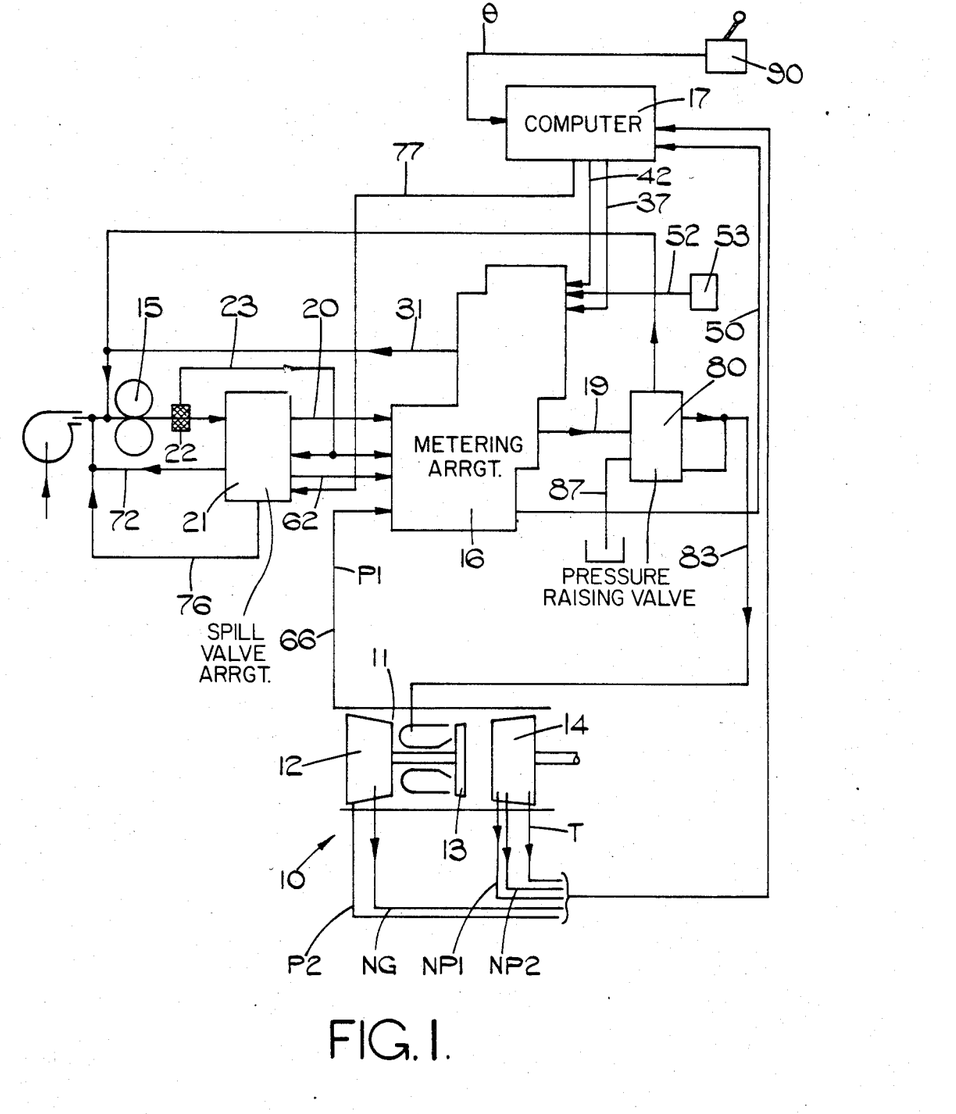
FIG. 1 is a block diagram of a fuel control system for a gas turbine engine.

The drawings are intended to be read in conjunction with one another and corresponding parts have been assigned identical reference numerals. As shown in FIG. 1 a gas turbine engine 10 includes a gas generator portion 11 having a compressor 12 and a turbine 13. The engine 10 further includes a separate work turbine 14. Fuel is supplied to the gas generator 11 by means of a positive displacement pump 15 which is driven by the gas generator 11. This fuel passes through a variable metering arrangement 16 whose operation is controlled by a computer 17 which is responsive to operating conditions of the engine 10.

Figure 2:
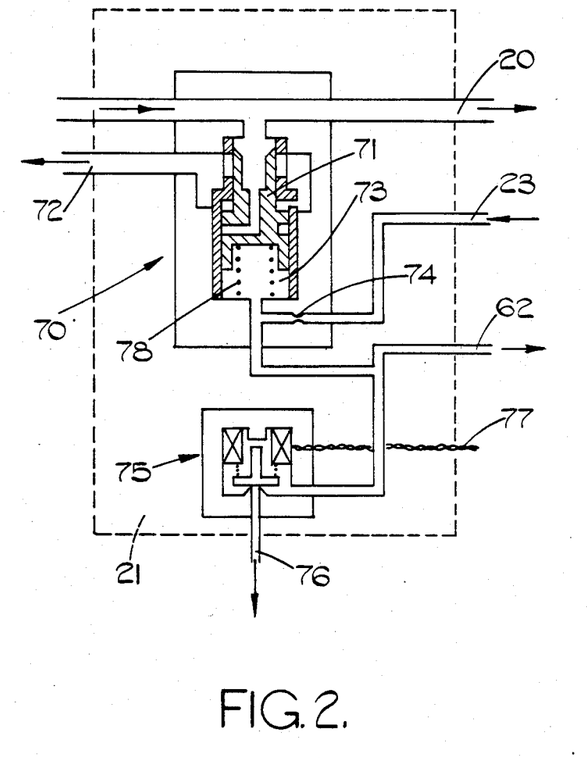
FIG. 2 is a diagram of a spill valve arrangement forming part of the system of FIG. 1.

The outlet of the pump 15 is connected to a supply line 20 which passes through a spill valve arrangement 21, shown in more detail in FIG. 2 and described in full hereafter. Between the pump 15 and spill valve arrangement 20 is a filter unit 22 for supplying fuel to a high pressure line 23.

Figure 3:
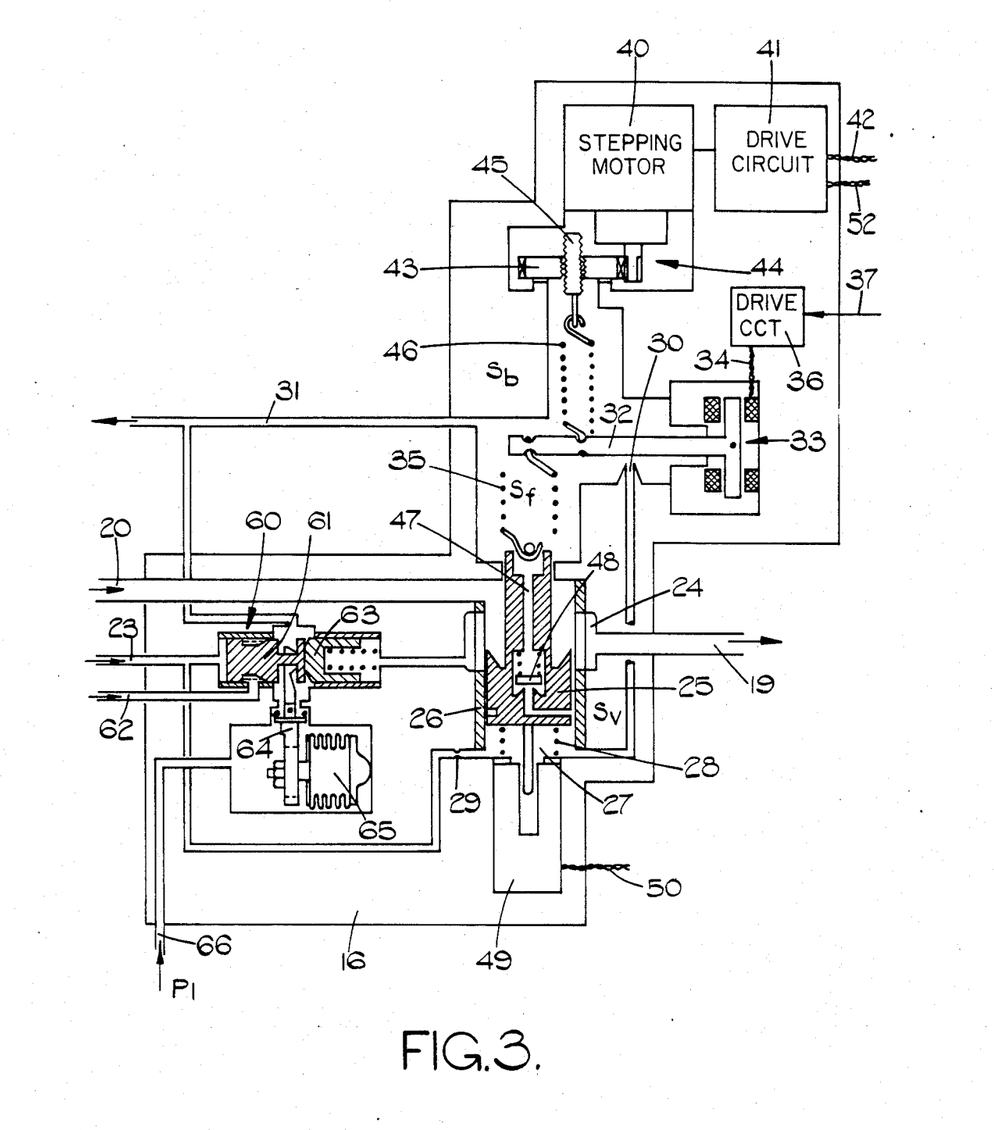
FIG. 3 is a diagram of a variable metering arrangement forming part of the system of FIG. 1.

The metering arrangement 16 is shown in more detail in FIG. 3 and includes a metering device 24 which regulates fuel flow from the supply line 20 to a delivery line 19. The metering device 24 includes a control element 25 which is slidable in a sleeve 26 and is responsive to a servo pressure in a chamber 27. A spring 28 acts on the control element 25 to urge the latter to a shut position, so that in the absence of system pressure in the lines 20, 23 the metering device 24 will shut off fuel flow. A restrictor 29 and a control valve 30 are connected in series between the high pressure line 23 and a low pressure line 31 which communicates with the inlet of the pump 15, the pressure in chamber 27 being that between the restrictor 29 and the valve 30.

The valve 30 has a control member 32 which is movable clockwise or anti-clockwise from a neutral position (shown) by a torque motor 33 responsive to current signals on a line 34 from a drive circuit 36 responsive to control signals from the computer 17. A feed-back spring 35 interconnects the control element 25 and control member 32 so that movement of the element 25 results in a change of pressure in the chamber 27 such as to oppose that movement.

The metering arrangement 16 also includes a stepping motor 40 and a drive circuit 41 therefor, the circuit 41 being responsive to control signals on lines 42 from the computer 17. The signals on lines 42 are indicative of the required speed of the motor 40, expressed as the number of steps per unit time. In the absence of signals on lines 42 the circuit 41 applies a holding signal to the motor 40, maintaining the latter in its last-operated position. The stepping motor 40 drives a nut 43 through gears 44, the nut 43 threadedly engaging a stem 45. A tension spring 46 is connected between the stem 45 and control member 32, so that the control member 32 is positioned by a balance of the forces corresponding to the operating positions of the torque motor 33, the stepping motor 40 and the metering control element 25. The stepping motor drive circuit 41 is also responsive to signals on a line 52 from a manually-operable switch 53 (FIG. 1), so that even in the absence of signals on the line 42 the motor 40 may be stepped by means of the switch 53.

The control element 25 has a through passage 47 which is provided with a non-return valve 48, so that when the control element 25 is in its shut position the delivery line 19 communicates with the low pressure return line 31. A displacement transducer 49 provides a signal, on a line 50 to the computer 17, indicative of the position of the control element 25.

The metering arrangement 16 further includes a valve 60 having a plunger element 61 which is urged by a rise in system pressure in the line 23 to increase communication between a passage 62 and the low pressure return line 31. The element 61 is urged in the opposite direction by a spring loaded plunger 63 which is responsive to the pressure in the delivery line 19. The valve 60 is thus responsive to an increase in the pressure difference across the metering device 24 to reduce the pressure in passage 62. The plunger element 61 is also acted on by a lever 64 which is coupled to an evacuated bellows unit 65, and the bellows unit 65 is subjected to the intake pressure P1 of the engine compressor 12, through a line 66. The arrangement is such that a decrease in the pressure P1 urges the plunger 61 in a direction to reduce pressure in the passage 62.

The spill valve arrangement 21 is shown in more detail in FIG. 2 and comprises a valve 70 having a stepped element 71 for controlling flow between the supply line 20 and a spill passage 72 which communicates with the inlet of the pump 15. The element 71 is biased to a shut position by a spring 78 and is also responsive to the pressure in a chamber 73 which communicates with the passage 62, and also communicates with the high pressure line 23 by way of a restrictor 74. The pressure in chamber 73 is thus regulated by the valve 60 (FIG. 3) in dependence on the metering pressure drop and the compressor inlet pressure P1, an increase in metering pressure drop causing reduction in the pressure in chamber 73 and opening the valve 70 to spill fuel back to the inlet of the pump 15. The arrangement is such that the pressure drop across the metering device 24 is maintained substantially constant for a given value of compressor inlet pressure P1. The arrangement 21 also includes an electro-magnetic valve 75 which is normally shut but which can be energised to connect the chamber 73 to the inlet of the pump 15 by way of a return line 76. The valve 75 is energised by a signal on a line 77 from the computer 17, in response to a requirement to shut down the engine 10 and results in the valve 70 spilling substantially the whole of the fuel in the supply passage 20 back to the inlet of the pump 15.

Figure 4:
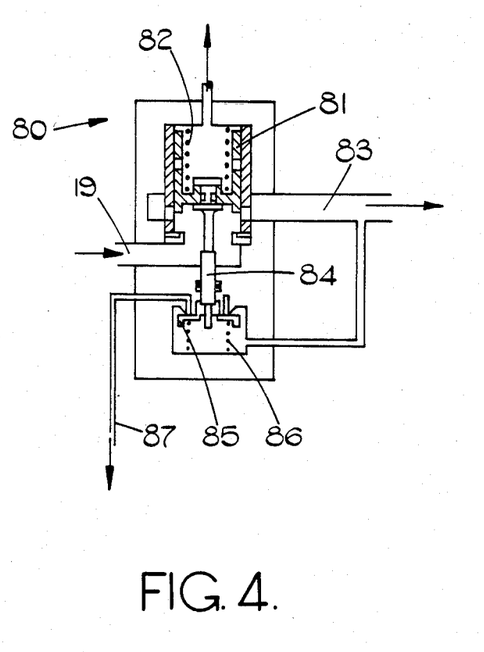
FIG. 4 is a diagram of a pressure raising valve forming part of the system of FIG. 1.

The fuel delivery line 19 communicates with the engine 10 by way of a pressure raising valve 80 which is shown in more detail in FIG. 4 and which includes a control element 81 biassed by a spring 82 to a shut position, the element 81 being movable against the spring 82 by the pressure in line 19, to allow fuel flow to the engine 10 through a delivery line 83. The function of the valve 80 is to prevent fuel flow to the engine 10 until the fuel pressure within the system has reached a predetermined level which is sufficient to provide the necessary operating servo pressures. If the electro-magnetic valve 75 (FIG. 2) is energized in response to a requirement to shut down the engine, the resulting reduction in fuel pressure throughout the system causes the valve 80 to shut completely under the influence of the spring 82. At the same time a stem 84 of the control element 81 lifts a plate valve 85 from its seat, against a spring 86 and thereby connects the delivery line 83 to a dump connection 87.

The computer 17 is responsive to sensed conditions of the engine 10, including a signal NG corresponding to the speed of the gas generator compressor 12, nominally identical signals NP1, NP2 which correspond to the speed of the power turbine 14, a signal T corresponding to the power turbine blade temperature, to the position of the metering control element 25 (FIG. 3) to the operating position $\theta$ of an engine power selector device 90 and to engine intake pressure P2. The computer 17 is arranged so that in steady running conditions of the engine 10 the metering control element 25 is held in position by the stationary stepping motor 40. During acceleration or deceleration the computer 17 provides signals on the line 34 to the torque motor 33, to increase or reduce fuel flow away from its steady running value. Additionally, as long as the signals to the torque motor 33 are sustained, the stepping motor 40 is energised to move the stem 45 in a direction which assists the torque from the motor 33. Signals to the torque motor 33 are progressively reduced as the engine 10 responds to changes in fuel flow and the system approaches a new steady state condition is approached, until control of fuel flow is once more under control of the stepping motor 40 alone.

Figure 5:
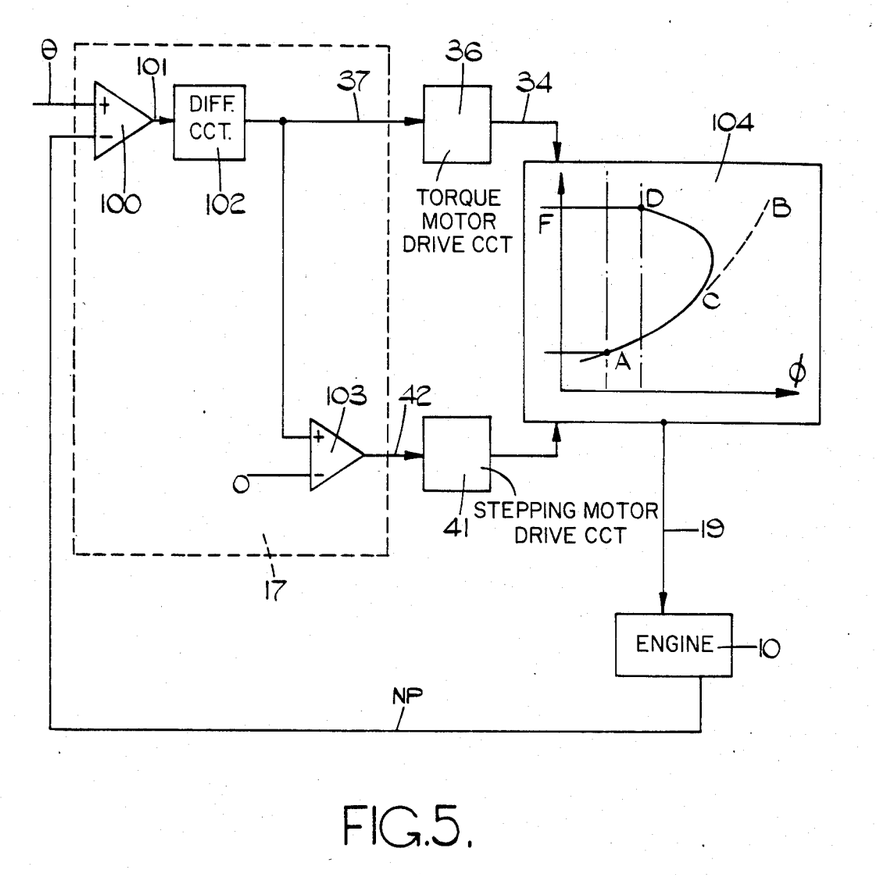
FIG. 5 is a diagram of a control function for the system.

The control function diagram shown in FIG. 5 indicates the computer 17 as being an analog computer, but it is to be understood that in alternative arrangements this computer would be digital. In either case the signals generated by the computer 17 are, as described above, responsive to gas generator speed NG, power turbine speed NP, power turbine blade temperature T, and the operating position $\theta$ of the engine power selector. In FIG. 5, however, only the values of NP and $\theta$ are shown as input signals.

The computer 17 includes a difference amplifier 100 responsive to the signals NP and $\theta$ to provide a speed error signal on a line 101 to a combined proportional amplifier, integrating and differentiating circuit 102. The circuit 102 provides a control signal on line 37 to the drive circuit 36 of the torque motor 33, this control signal indicating the change in fuel flow required to effect acceleration or deceleration. The signal on line 37 is also applied to a further difference amplifier 103 which provides an output signal on the line 42 to the stepping motor control circuit 41 (FIG. 3). The arrangement is such that the stepping motor 40 moves relatively slowly and in a sense to follow the movement applied to the lever control member 32 by the torque motor 33.

The block 104 in FIG. 5 shows fuel flow F plotted against angular position $\phi$ of the control member 32, during an acceleration of the engine 10. A acceleration speed-error signal on line 101 provides a signal on line 34 to the torque motor 33, increasing flow through the valve 30 and moving the control element 25 rapidly to increase fuel flow F. This effect is indicated in block 104 by the line AB, in which A indicates the original steady-state condition. Follow-up of the stepping motor 40 increasingly affects the lever control member 32, so that as the speed error signal reduces the stepping motor 40 continues, relatively slowly, to drive the control member 32 to a new steady-state condition, indicated at D, from the condition C on line AB.

It will be apparent that a similar sequence of events, but in a direction reverse to that shown in block 104, operate during deceleration.

It is arranged that malfunction of the computer 17, or of its input or output circuits, results in removal of signals from the lines 37, 42. Removal of the signals from line 37 has the effect that the control member 32 (FIG. 3) is responsive only to forces derived from the stepping motor 40 and the position of the control element 25. In the absence of signals on line 42 the motor 40 is effectively locked in the operating position in which failure occurred. Since the motor 40 controls only steady state running of the engine 10 there is no danger that de-energisation of the motor 40 will cause the engine 10 to be accelerated or decelerated outside its design limits.

Malfunction as indicated above thus causes the system to be held at the steady state condition at the time of occurrence of failure. However, subsequent manual operation of the switch 53 enables the system to be set to a new steady state running condition if required.

Figure 6:
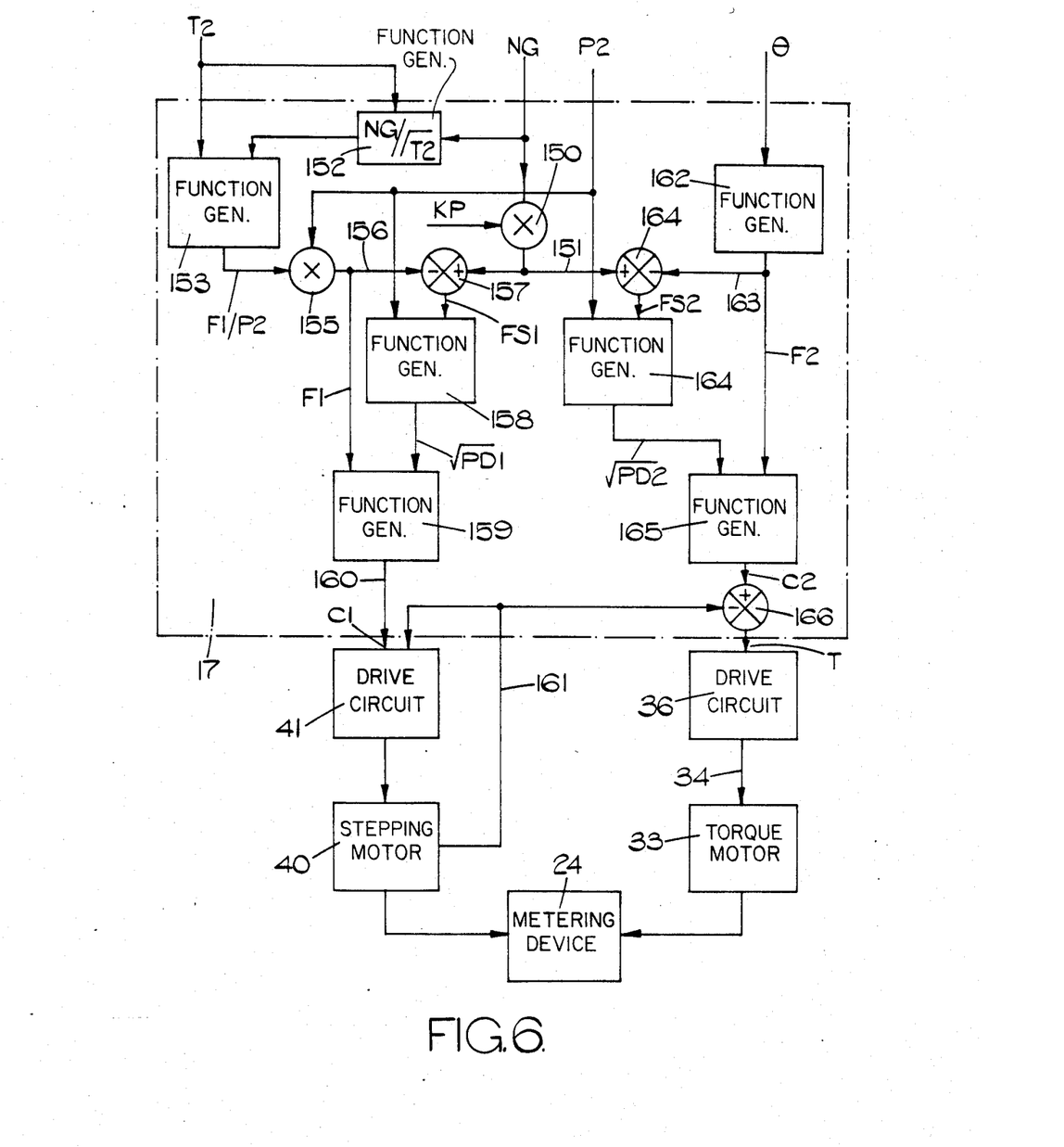
FIG. 6 is a diagram of an alternative form of control function.
Figure 7:
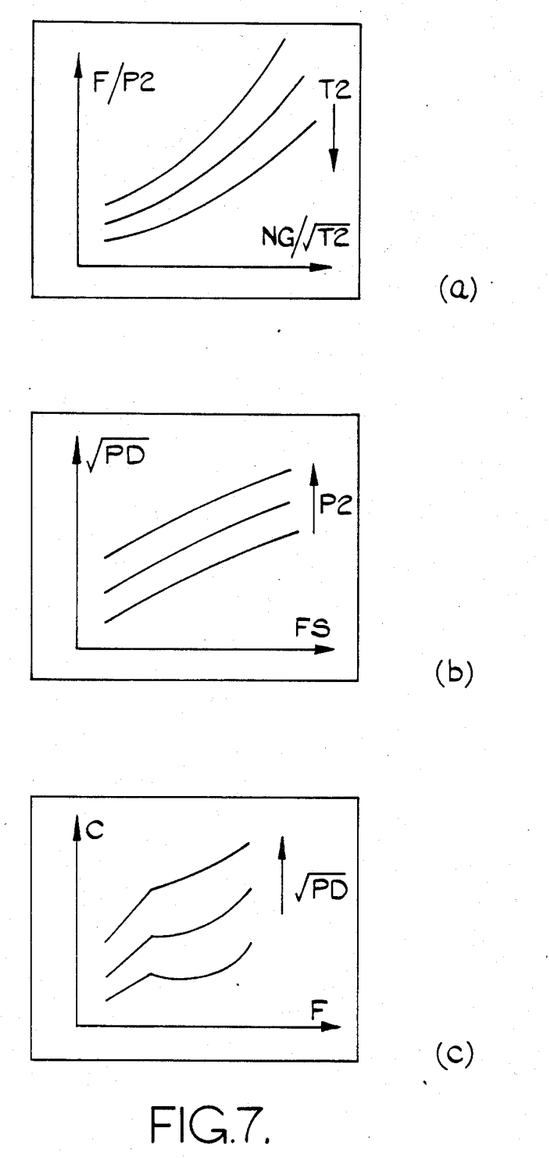
FIGS. 7a-7c show functions of elements forming parts of FIG. 6.

The alternative form of control function of FIGS. 6 and 7 is also shown in terms of analog operation, but may be performed digitally. For the control function of FIG. 6 the computer 17 is responsive to signals corresponding to the operating position $\theta$ of the engine power selector lever 90, engine intake pressure P2, engine intake temperature T2 and the speed NG of the gas generator 11.

The signal NG is multiplied in a circuit 150 by a factor kP corresponding to the performance of the pump 15 to provide, on a line 151, a signal FP corresponding to fuel flow delivered by the pump 15. The signals NG and T2 are applied to a function generator 152 which supplies a signal corresponding to $NG/\sqrt{T2}$ to a further function generator 153 whose characteristics are shown in FIG. 7 (a) and which supplies, on a line 154, a signal F1/P2, where F1 is a calculated value of the steady-state fuel flow which corresponds to the values of NG and T2. The signal F1/P2 is multiplied by the signal P2 in a circuit 155 to provide a signal corresponding to the value of F1 on a line 156.

The F1 signal on line 156 is subtracted from the pump delivery signal FP on line 151 by a circuit 157, to provide a difference signal FS1 which corresponds to the spill flow required from the valve 70 (FIG. 2) in a steady running condition of the engine 10. The signals P2 and FS1 are applied to a function generator 158 whose characteristics are shown in FIG. 7 (b) and which supplies an output signal $\sqrt{PD1}$ corresponding to the square route of the pressure drop through the metering device 24 (FIG. 3) in a steady running condition of the engine 10.

A further function generator 159 whose characteristics are shown in FIG. 7 (c) is responsive to the $\sqrt{PD1}$ and F1 signals to generate a control signal C1 on a line 160, the signal C1 corresponding to a desired operating position of the stepping motor 40 to provide the required steady-running fuel flow. The signal C1 is applied to the drive circuit 41 of the stepping motor 40. For the purposes of this embodiment the stepping motor 40 is arranged to provide a position feedback signal on a line 161 to the circuit 41, so that no stepping pulses are supplied to the motor 40 when the latter is in an operating position which corresponds to the desired steady-running fuel flow.

A function generator 162 is responsive to the power demand signal $\theta$ to generate, on a line 163, a signal F2 which indicates the total desired fuel flow corresponding to the signal $\theta$ (that is the sum of the steady-running fuel flow together with any modification of flow to effect acceleration or deceleration). The signal F2 is subtracted from the pump delivery signal FP by a circuit 164 to give a signal FS2 which corresponds to the spill flow required from the valve 70 (FIG. 2), this spill flow being that for steady running, acceleration or deceleration as appropriate, dependent on the operating conditions of the selector device 90 and the engine 10. The spill flow signal FS2 and the signal P2 are applied to a function generator 164 identical to the generator 158, the generator 164 providing an output signal $\sqrt{PD2}$ corresponding to the square route of the pressure drop through the metering device 24 in any fuel flow condition, including steady-running, acceleration or deceleration. The $\sqrt{PD2}$ signal and the F2 signal are applied to a function generator 165 identical with the generator 159. The generator 165 provides an output signal C2 which corresponds to the current signal which would be required to be applied to the torque motor 33 if the latter was acting alone to provide the total fuel flow. The stepping motor position signal on line 161 is subtracted from the signal C2 by a circuit 166 to give a signal T on the line 37, the signal T corresponding to the torque motor current required to effect acceleration or deceleration away from the steady-running condition set by the stepping motor 40. The metering device 24 is responsive to the operating position of the stepping motor 40 and torque motor 33 as shown and described with reference to FIG. 3.

Figure 8:
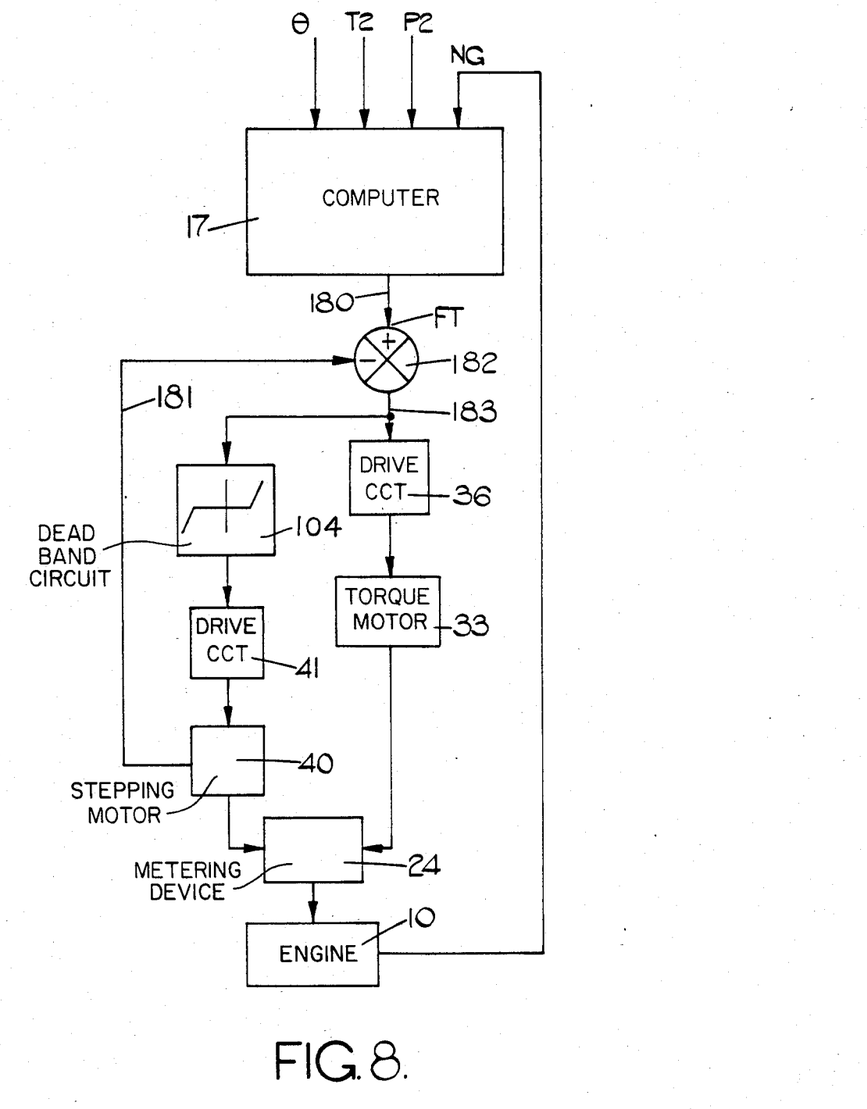
FIG. 8 is a diagram of a further alternative form of control function.

The further alternative form of control shown in FIG. 8 is a modification of that shown in FIG. 5. The computer 17 is responsive to signals NG, P2, T2 and $\theta$ to provide an output signal FT on a line 180, the signal FT corresponding to the total required fuel flow for steady-running, acceleration or deceleration, as appropriate. A feedback signal on a line 181 indicates the operating position of the stepping motor 40, and hence the fuel flow to the engine 10. The signal on line 181 is subtracted from the signal FT by means of a circuit 182. An output signal on a line 183 from the circuit 182 corresponds to the amount by which the torque motor 33 must move to provide acceleration or deceleration, and this signal is also used to control the stepping motor 40 so that the latter will move to a new steady-running position. The signal on line 183 is applied to the stepping motor circuit 41 by way of a "dead band" circuit 184 to prevent the stepping motor 40 from "hunting" in response to small transient signals on the line 183.

Though the systems described above effect fuel metering by means of a throttle valve device, it is to be understood that the metering device may alternatively be a spill valve which acts to vary the pressure difference through a metering orifice.

What is claimed:

1. A fuel control system for a gas turbine engine, comprising a fuel metering device, control means for positioning said metering device, means for generating first and second electrical signals in response to operating conditions of said engine, a stepping motor responsive to said first electrical signals, means for regulating a first force output in response to operation of said stepping motor, a torque motor for providing a second force output corresponding to said second electrical signal, and means for summing said first and second force outputs so that a change in said first force output in response to said first electrical signal acts on said control means more slowly than said second force output, said control means being responsive to the sum of said force outputs for positioning said metering device, whereby in the absence of said electrical signals said metering device is positioned in accordance with an operated position of said stepping motor.

2. A control system as claimed in claim 1 in which the means for regulating the first force output comprises a spring and threadedly interengaged elements, said elements being respectively coupled to a shaft of said stepping motor and to an end of said spring.

3. A control system as claimed in claim 2 in which the other end of said spring co-operates with an output element of said torque motor.

4. A control system as claimed in claim 3 in which said control device includes a servo valve having a control element acted on by said first and second force outputs, said fuel metering device being responsive to a servo pressure controlled by said servo valve.

5. A control system as claimed in claim 4 in which said servo valve control element is the output element of said torque motor.

6. A control system as claimed in claim 4 which includes a further spring interconnecting said fuel metering device and said servo valve control element so that operation of said metering device in response to a change in said servo pressure biases said control element in a direction to oppose said change.

7. A control system as claimed in claim 5 which includes a further spring interconnecting said fuel metering device and said servo valve control element so that operation of said metering device in response to a change in said servo pressure biases said control element in a direction to oppose said change.

8. A fuel control for a gas turbine engine, comprising a fuel metering device, means for generating a first electrical signal corresponding to a fuel flow rate for a desired steady-state running condition of said engine, means for generating a second electrical signal corresponding to a fuel flow rate for effecting transfer from an existing running condition of said engine to said desired running condition, a stepping motor responsive to said first electrical signal, means for regulating a first force output corresponding to an operating position of said stepping motor, a torque motor for providing a second force output in response to said second electrical signal, means for summing said first and second force outputs and means for positioning said metering device in accordance with the sum of said forces, whereby in the absence of said electrical signals or of said second force output said metering device is positioned in accordance with the operated position of said stepping motor.

9. A control system as claimed in claim 8 in which the means for regulating the first force output comprises a spring and threadedly interengaged elements, said elements being respectively coupled to a shaft of said stepping motor and to an end of said spring.

10. A fuel control system for a gas turbine engine, comprising a fuel metering device, a stepping motor responsive to a signal which indicates a fuel flow rate for a desired steady-running condition of the engine, a torque motor responsive to a signal which indicates a fuel flow rate required to cause said engine to adopt said steady running conditions, and control means responsive to the operative positions of said stepping motor and said torque motor for controlling said metering device, whereby the effect of said torque motor on said control means decreases as said desired steady running condition is approached.

* * * * *